(12) United States Patent
Yoo et al.

(10) Patent No.: US 11,884,759 B2
(45) Date of Patent: Jan. 30, 2024

(54) LOW-DIELECTRIC THERMALLY CURABLE RESIN COMPOSITION AND LOW DIELECTRIC MATERIAL PREPARED THEREFROM

(71) Applicant: KOREA ELECTRONICS TECHNOLOGY INSTITUTE, Seongnam-si (KR)

(72) Inventors: Myong Jae Yoo, Seoul (KR); Churl Seung Lee, Seongnam-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 117 days.

(21) Appl. No.: 17/541,023

(22) Filed: Dec. 2, 2021

(65) Prior Publication Data

US 2022/0169769 A1    Jun. 2, 2022

(30) Foreign Application Priority Data

Dec. 2, 2020   (KR) .................... 10-2020-0166208

(51) Int. Cl.
   *C08F 220/58*   (2006.01)
   *C08F 220/28*   (2006.01)
   (Continued)

(52) U.S. Cl.
   CPC ........ *C08F 220/58* (2013.01); *C08F 220/282* (2020.02)

(58) Field of Classification Search
   CPC ............... C08F 220/58; C08F 220/282; C08F 222/102; C08F 220/18; C08F 220/34
   See application file for complete search history.

(56) References Cited

U.S. PATENT DOCUMENTS 5,171,888 A   12/1992  Roling
2014/0005342 A1 *  1/2014  Reijnders ............. C08K 5/0091
                                                525/445

FOREIGN PATENT DOCUMENTS

EP   2762544 A1 *  8/2014  ............. B32B 27/08
EP   3006515 A1 *  4/2016  ................ C08F 2/50
(Continued)

OTHER PUBLICATIONS

Notice of Allowance dated Jan. 20, 2023 for Korean Patent Application No. 10-2020-0166208.
(Continued)

*Primary Examiner* — Catherine S Branch
(74) *Attorney, Agent, or Firm* — Knobbe, Martens, Olson & Bear, LLP

(57) ABSTRACT

This application relates to a low-dielectric thermally curable resin composition for solving a problem of increased transmission loss. In one aspect, the low-dielectric thermally curable resin composition includes a (meth)acrylic monomer having an alicyclic heterocycle, a polyfunctional (meth)acrylic monomer, an initiator, and a curing accelerator, and a low dielectric material prepared therefrom. Various embodiments can provide excellent low dielectric properties with a dielectric constant (Dk) in a high frequency area of 1 to 20 GHz of less than, for example, 3.28. In addition, the low dielectric material can have a significantly reduced transmission loss with a dissipation factor (Df) in an area of 1 to 20 GHz of less than, for example, 0.008, and thus, may implement excellent transmission properties in excellent 5G mobile communication.

10 Claims, 1 Drawing Sheet

(51) Int. Cl.
*C08F 222/10* (2006.01)
*C08F 220/18* (2006.01)
*C08F 220/34* (2006.01)

(56) References Cited

FOREIGN PATENT DOCUMENTS

| | | |
|---|---|---|
| JP | H06-206919 A | 7/1994 |
| KR | 2000-0068847 A | 11/2000 |
| KR | 10-2014-0022458 A | 2/2014 |
| KR | 10-2015-0092510 A | 8/2015 |

OTHER PUBLICATIONS

Korean Office Action dated Jul. 18, 2022 for Korean Patent Application No. 10-2020-0166208.

* cited by examiner

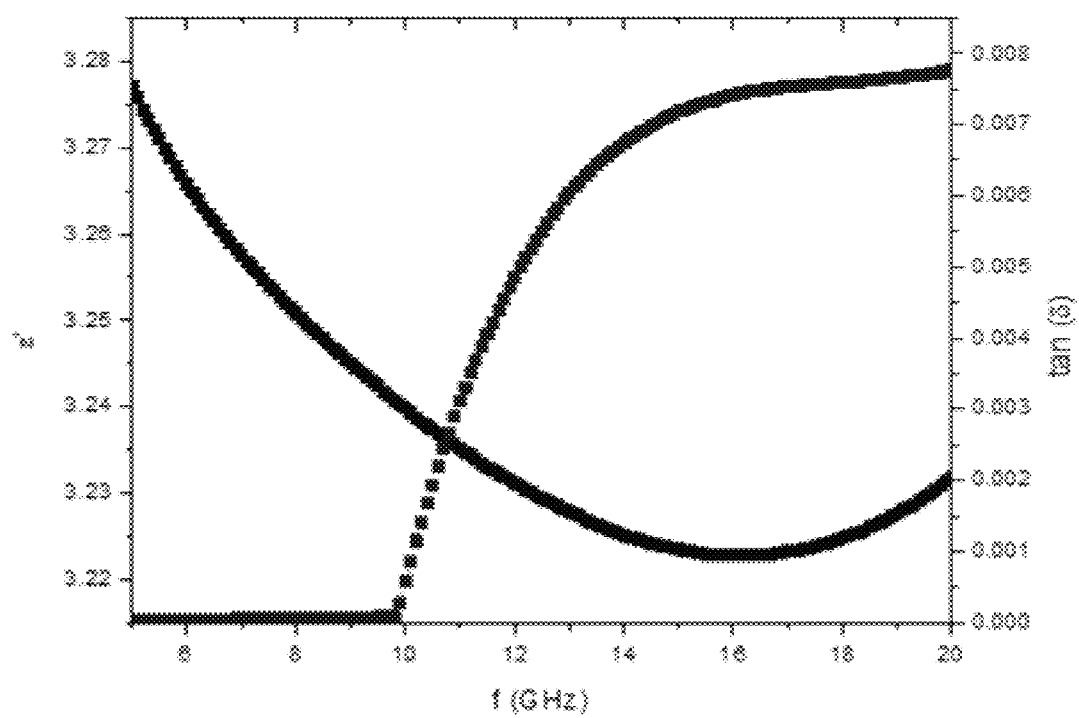

LOW-DIELECTRIC THERMALLY CURABLE RESIN COMPOSITION AND LOW DIELECTRIC MATERIAL PREPARED THEREFROM

CROSS-REFERENCE TO RELATED APPLICATIONS

This application claims priority under 35 U.S.C. 119 to Korean Patent Application No. 10-2020-0166208 filed on Dec. 2, 2020 in the Korean Intellectual Property Office, the disclosure of which is incorporated herein by reference in its entirety.

BACKGROUND

Technical Field

The following disclosure relates to a low-dielectric thermally curable resin composition and a low dielectric material prepared therefrom.

Description of Related Technology

According to a recent demand for speeding up a transmission signal, an increase in the frequency of the transmission signal is significantly occurring, and thus, the era of downloading 1 GB in 10 seconds, that is, the 5G networks era, is opening.

SUMMARY

An embodiment of the present disclosure is directed to providing a low-dielectric thermally curable resin composition having a significantly reduced dielectric loss in a high frequency area of 3.5 GHz to 28 GHz and a low dielectric material prepared therefrom.

In particular, a low dielectric material which has a dielectric constant (Dk) of less than 4 in a high frequency area where the dissipation factor (Df, tan δ) of less than 0.08 reduce a transmission loss, thereby being applied to 5G mobile communication, is to be provided.

In addition, a low-dielectric thermally curable resin composition which may be subjected to a conventional thermal curing process at 180° C. or lower as it is and is easy to have a larger area to be appropriate for manufacturing a large structure, is to be provided.

In one general aspect, a low-dielectric thermally curable resin composition includes: a (meth)acrylic monomer having an alicyclic heterocycle, a polyfunctional (meth)acrylic monomer, an initiator, and a curing accelerator.

In an exemplary embodiment of the present disclosure, the alicyclic heterocycle of the (meth)acrylic monomer having an alicyclic heterocycle has 4 to 6 carbon atoms and one or two hetero elements selected from the group consisting of nitrogen, oxygen, and sulfur.

In an exemplary embodiment of the present disclosure, the alicyclic heterocycle may have a dipole moment of less than 2.

In an exemplary embodiment of the present disclosure, the polyfunctional (meth)acrylic monomer may be any one or two or more selected from dipropylene glycol di(meth)acrylate, diethylene glycol di(meth)acrylate, tripropylene glycol di(meth)acrylate, and triethylene glycol di(meth)acrylate.

In an exemplary embodiment of the present disclosure, the (meth)acrylic monomer having an alicyclic heterocycle and a polyfunctional (meth)acrylic monomer may be included at a weight ratio of 1.5:1 to 1:1.5.

In an exemplary embodiment of the present disclosure, the initiator may be a peroxide-based initiator having a half-life of 25 to 35 hours in a 0.2 M benzene solution at 145° C.

In an exemplary embodiment of the present disclosure, the curing accelerator may be any one or two or more selected from manganese acetate, manganese naphthalate, manganese carbonate, and manganese bromide.

The low-dielectric thermally curable resin composition of the present disclosure may have a viscosity of 100 mPa·s to 500 mPa·s at 25° C.

In another general aspect, a low dielectric material prepared by thermally curing the low-dielectric thermally curable resin composition is provided.

In an exemplary embodiment of the present disclosure, the thermal curing may be performed at 130° C. to 200° C.

The low dielectric material may have a dielectric constant (Dk) at a frequency of 10 to 20 GHz of less than 3.24.

The low dielectric material may have a dissipation factor (Df) at a frequency of 10 to 20 GHz of less than 0.008.

The low dielectric material prepared from the low-dielectric thermally curable resin composition according to the present disclosure has an effect of having excellent low dielectric properties with a dielectric constant (Dk) in a high frequency area of 1 to 20 GHz of less than 3.28. In addition, the low dielectric material has a significantly reduced transmission loss with a dissipation factor (Df) in an area of 1 to 20 GHz of less than 0.008, and thus, may implement excellent transmission properties in excellent 5G mobile communication.

Furthermore, the low-dielectric thermally curable resin composition according to the present disclosure may be prepared using a conventional thermal curing process, may be cured in a temperature range of 130 to 180° C., may be easy to have a larger area and a larger size and control the shape, and may be preferably applied to a large structure as well as a small part.

BRIEF DESCRIPTION OF THE DRAWINGS

FIGURE a graph showing a dielectric constant and a dielectric constant of a low dielectric material prepared in Example 1 in a frequency area of 1 GHz to 20 GHz.

DETAILED DESCRIPTION

Unlike 4G using a frequency of 2 GHz or less, an ultra-high band frequency of 28 GHz is used in 5G, and since such a high frequency signal is easily attenuated, a method of suppressing a transmission loss is demanded. A transmission loss may be classified into a "dielectric loss" derived from an insulating material and a "conductor loss" derived from a (ductile) copper foil laminate itself. Furthermore, since a ratio between energy consumed in a dielectric body per one cycle of alternating electric field and energy stored in the dielectric body is referred to as a dissipation factor (tan δ) and a dielectric loss is proportional to a product of a relative permittivity and the dissipation factor of a material, the dielectric loss is further increased in a high frequency area. In addition, since a heating value per unit area is increased depending on a higher-density mounting of an electronic element, it is necessary to use a material having a low tan δ for decreasing a dielectric loss of an insulating material even to a small extent. Since the dielectric loss and heat due to electrical resistance are suppressed by using a low dielectric polymer material having a low dielectric loss, and as a result, a signal malfunction is reduced, a material having a low transmission loss is strongly required in the high frequency communication field in a range of 3.5 GHz to 28 GHz.

However, for typical communication board materials, antenna materials, and the like, thermally curable composite materials such as a polyimide resin, an epoxy resin, and an ester resin mostly including glass fiber are provided, but the materials have a dielectric constant of 4 or more and do not satisfy a dielectric constant required in 5G and 6G communication bands, thereby increasing the transmission loss.

Accordingly, a novel low dielectric material which may be applied to the 5G mobile communication requiring a high frequency area of 3.5 GHz to 28 GHz is required.

Hereinafter, the present disclosure will be described in more detail with reference to specific examples and exemplary embodiments including the accompanying drawings. However, the following specific examples or exemplary embodiments are only a reference for describing the present disclosure in detail, and the present disclosure is not limited thereto, and may be implemented in various forms.

In addition, unless otherwise defined, all technical terms and scientific terms have the same meanings as those commonly understood by one of those skilled in the art to which the present disclosure pertains. The terms used herein are only for effectively describing a certain specific example, and are not intended to limit the present disclosure.

In addition, the singular form used in the specification and claims appended thereto may be intended to also include a plural form, unless otherwise indicated in the context.

In addition, unless particularly described to the contrary, "comprising" any elements will be understood to imply further inclusion of other elements rather than the exclusion of any other elements.

The term "(meth)acrylate" used in the present disclosure is used to refer to both "methacrylate" and "acrylate".

The present disclosure for achieving the above object provides a low-dielectric thermally curable resin composition and a low dielectric material prepared therefrom.

The present inventors provided thermally curable composite materials such as a polyimide resin, an epoxy resin, and an ester resin mostly including glass fiber, for conventional communication board materials, antenna materials, and the like, but since the materials have a dielectric constant of 4 or more and do not satisfy a dielectric constant required in 5G and 6G communication bands, a transmission loss is increased, and thus, the present inventors recognized the problem and intensively studied a new low dielectric material to solve the problem.

Accordingly, the present inventors confirmed that by thermally curing a low-dielectric thermally curable resin composition including a (meth)acrylic monomer having an alicyclic heterocycle, a polyfunctional (meth)acrylic monomer, an initiator, and a curing accelerator to prepare a low dielectric material, a dielectric constant (Dk) is less than 3.23 and a dissipation factor (Df) is less than 0.008 in a high frequency area of 10 GHz to 20 GHz, and thus, excellent transmission properties may be implemented in a high frequency area, thereby completing the present disclosure.

Hereinafter, the low-dielectric thermally curable resin composition and the low dielectric material prepared therefrom according to the present disclosure will be described in detail. The low-dielectric thermally curable resin composition according to the present disclosure includes a (meth) acrylic monomer having an alicyclic heterocycle, a polyfunctional (meth)acrylic monomer, an initiator, and a curing accelerator.

The (meth)acrylic monomer having an alicyclic heterocycle refers to a (meth)acrylic monomer having an alicyclic heterocycle having a hetero element, and the alicyclic heterocycle may have 4 to 6 carbon atoms and one or two hetero elements selected from the group consisting of nitrogen (N), oxygen (O), and sulfur (S).

In addition, the alicyclic heterocycle may have a dipole moment of less than 2, and by having the dipole moment as such, the polarity is decreased closer to a non-polar molecule in spite of the hetero element included therein. Thus, a polarization density ($C/m^2$) of a dielectric body which is the sum of total dipole moments of a low dielectric material which is a cured body described later is decreased to improve low dielectric properties, which is thus preferred.

A preferred example of the (meth)acrylic monomer having an alicyclic heterocycle may be any one or two or more selected from N-(acryloyl)morpholine, N-(acryloyl)piperidine, and the like.

As the polyfunctional (meth)acrylic monomer, a difunctional acrylate may be preferably used, and specifically, any one or two or more selected from dipropylene glycol di(meth)acrylate, diethylene glycol di(meth)acrylate, tripropylene glycol di(meth)acrylate, triethylene glycol di(meth)acrylate, and the like may be used, but the present disclosure is not limited thereto.

The (meth)acrylic monomer having an alicyclic heterocycle and the polyfunctional (meth)acrylic monomer may be included at a weight ratio of 2:0.5 to 2, preferably 1.5:1 to 1:1.5, but the present disclosure is not limited thereto.

The initiator is a material for producing radicals for initiating polymerization, and may be a peroxide-based initiator having a half-life of 25 hours to 35 hours in a 0.2 M benzene solution at 145° C.

An example of the initiator may be cumene hydroperoxide or the like.

The initiator may be included at 0.1 to 10 wt %, preferably 0.3 to 5 wt %, and more preferably 0.5 to 2 wt %, with respect to the total weight of the low dielectric resin composition, but is not limited thereto.

When the initiator having the half-life is used, curing may be performed in a temperature range of 130 to 180° C., so that a conventional hot air processing device may be applied as it is, and a large structure, a large area, and the like may be easily implemented while being economical.

The curing accelerator is a material for accelerating curing, and as a specific example, any one or two or more selected from manganese acetate, manganese naphthalate, manganese carbonate, and manganese bromide may be used, but the present disclosure is not limited thereto. In addition, the curing accelerator may be included at less than 1 wt %, preferably 0.01 to 0.9 wt %, with respect to the total weight of the low-dielectric resin composition, but is not limited thereto.

The low-dielectric thermally curable resin composition according to an exemplary embodiment of the present disclosure may have a viscosity of 100 mPa·s to 1000 mPa·s, preferably 150 mPa·s to 500 mPa·s at 25° C., and within the viscosity range, the shape and size of the low dielectric material which is a cured product to be implemented may be easily controlled, which is thus preferred. The low dielectric material according to an exemplary embodiment of the present disclosure may be prepared by thermally curing the low-dielectric thermally curable resin composition described above.

The thermal curing may be performed at 130° C. to 200° C., preferably 150° C. to 180° C., and the curing may be performed for 30 minutes to 12 hours, but the present disclosure is not limited thereto.

The thermal curing method may be any known method without limitation, and preferably, a hot air dryer may be used.

The low-dielectric thermally curable resin composition according to an exemplary embodiment of the present disclosure may be implemented into a cured body at a temperature of 130° C. to 200° C., as described above, and a conventional thermal curing device may be applied as it is, and thus, a low dielectric material may be economically prepared, and it is also easy to implement a large structure or a large area.

The low dielectric material has a dielectric constant (Dk) at a frequency of 1 GHz to 20 GHz of less than 3.28 and a dielectric constant at a frequency of 10 GHz to 20 GHz of less than 3.24, more specifically less than 3.23, and thus, implements excellent low dielectric properties in a high frequency area.

In addition, the low dielectric material has a dissipation factor (Df) at a frequency of 1 to 20 GHz of less than 0.008, more specifically a dissipation factor at a frequency of 10 to 20 GHz of less than 0.008, and more specifically less than 0.0079, and thus, has a low dielectric loss at a high frequency area, thereby implementing excellent transmission properties. As described above, the low dielectric material prepared using the low-dielectric thermally curable resin composition of the present disclosure has a low dielectric constant (Dk) and a low dissipation factor (Df) in a high frequency area of 1 GHz to 20 GHz, which suggests that transmission properties in a 5G mobile communication area may be improved and the material is preferably applied.

In particular, since the low-dielectric thermally curable resin composition of the present disclosure may be thermally cured under a temperature condition of 150° C. to 180° C., it may be applied to a conventionally built curing device as it is, and thus, it is economical and it is easy for a dielectric material which is a molded body to have a larger size and a larger area.

Hereinafter, the present disclosure will be described in more detail with reference to the Examples and Comparative Examples. However, the following Examples and Comparative Examples are only an example for describing the present disclosure in more detail, and do not limit the present disclosure in any way.

[Experimental Method]

1. Measurement of Dielectric Constant and Dissipation Factor

A low dielectric material prepared in Example 1 was cut into a size of 5 cm×5 cm×1 mm to prepare a specimen, and the value was measured with a frequency sweep of 5 to 200 GHz, using DAK-TL available from Dymstec.

Example 1

Acryloyl morpholine and dipropylene glycol diacrylate were mixed at a weight ratio of 1:1 to prepare a monomer mixture, and 1 wt % of cumene hydroperoxide and 0.1 wt % of manganese naphthalate were added with respect to 100 parts by weight of the prepared monomer mixture to prepare a resin composition.

The prepared resin composition was cured at 150° C. for 30 minutes to prepare a low dielectric material.

The dielectric constant and the dissipation factor of the low dielectric material prepared in Example 1 were measured and are shown in FIGURE.

As shown in FIGURE, it was confirmed that the low dielectric material prepared in Example 1 had a dissipation factor (tan $\delta$) in a frequency area of 10 to 20 GHz of less than 0.008. In addition, it was confirmed that the low dielectric material had a dielectric constant ($\epsilon'$) in a frequency area of 10 to 20 GHz of less than 3.23.

That is, the low-dielectric thermally curable resin composition according to the present disclosure has a low dielectric constant and a low dissipation factor even at a high frequency of 2 GHz or higher, and thus, may implement excellent transmission properties and may be preferably applied in 6G mobile communication as well as 5G mobile communication.

Hereinabove, although the present disclosure has been described by specific matters, limited exemplary embodiments, and drawings, they have been provided only for assisting the entire understanding of the present disclosure, and the present disclosure is not limited to the exemplary embodiments, and various modifications and changes may be made by those skilled in the art to which the present disclosure pertains from the description.

Therefore, the spirit of the present disclosure should not be limited to the above-described exemplary embodiments, and the following claims as well as all modified equally or equivalently to the claims are intended to fall within the scope and spirit of the invention.

What is claimed is:

1. A low dielectric material prepared by thermally curing a low-dielectric thermally curable resin composition,
    the low-dielectric thermally curable resin composition comprising: a (meth)acrylic monomer having an alicyclic heterocycle, a polyfunctional (meth)acrylic monomer, an initiator, and a curing accelerator,
    wherein the low dielectric material has a dielectric constant (Dk) at a frequency of 10 GHz to 20 GHz of less than 3.24.

2. The low dielectric material of claim 1, wherein the thermal curing is performed at 130° C. to 200° C.

3. A low dielectric material prepared by thermally curing a low-dielectric thermally curable resin composition,
    the low-dielectric thermally curable resin composition comprising: a (meth)acrylic monomer having an alicyclic heterocycle, a polyfunctional (meth)acrylic monomer, an initiator, and a curing accelerator,
    wherein the low dielectric material has a dissipation factor (Df) at a frequency of 10 GHz to 20 GHz of less than 0.008.

4. The low dielectric material of claim 1, wherein the alicyclic heterocycle of the (meth)acrylic monomer having an alicyclic heterocycle has 4 to 6 carbon atoms and one or two hetero elements selected from the group consisting of nitrogen, oxygen, and sulfur.

5. The low dielectric material of claim 4, wherein the alicyclic heterocycle has a dipole moment of less than 2.

6. The low dielectric material of claim 1, wherein the polyfunctional (meth)acrylic monomer is at least one selected from the group consisting of dipropylene glycol di(meth)acrylate, diethylene glycol di(meth)acrylate, tripropylene glycol di(meth)acrylate, and triethylene glycol di(meth)acrylate.

7. The low dielectric material of claim 1, wherein the (meth)acrylic monomer having an alicyclic heterocycle and the polyfunctional (meth)acrylic monomer are included at a weight ratio of 1.5:1 to 1:1.5.

8. The low dielectric material of claim 1, wherein the initiator is a peroxide-based initiator having a half-life of 25 hours to 35 hours in a 0.2 M benzene solution at 145° C.

9. The low dielectric material of claim 1, wherein the curing accelerator is at least one selected from the group consisting of manganese acetate, manganese naphthalate, manganese carbonate, and manganese bromide.

10. The low dielectric material of claim 1, wherein the low-dielectric thermally curable resin composition has a viscosity of 100 mPa·s to 500 mPa·s at 25° C.

* * * * *